US010510176B2

(12) United States Patent
Salt (10) Patent No.: US 10,510,176 B2
(45) Date of Patent: *Dec. 17, 2019

(54) EFFICIENT IMAGE TRANSMISSION (71) Applicant: Callahan Cellular L.L.C., Wilmington, DE (US)

(72) Inventor: Bryan Salt, St. Albans (GB)

(73) Assignee: Callahan Cellular L.L.C., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/953,569

(22) Filed: Apr. 16, 2018

(65) Prior Publication Data

US 2018/0232939 A1   Aug. 16, 2018

Related U.S. Application Data

(63) Continuation of application No. 15/384,008, filed on Dec. 19, 2016, now Pat. No. 9,947,127, which is a
(Continued)

(30) Foreign Application Priority Data

Jan. 15, 2002   (GB) .................................. 0200797.9

(51) Int. Cl.
*G06T 15/00* (2011.01)
*H04L 29/08* (2006.01)
(Continued)

(52) U.S. Cl.
CPC ............ *G06T 15/005* (2013.01); *G06T 15/04* (2013.01); *G06T 15/80* (2013.01); *G06T 17/20* (2013.01);
(Continued)

(58) Field of Classification Search
CPC ........................................................ H04L 67/10
(Continued)

(56) References Cited

U.S. PATENT DOCUMENTS

| 5,684,604 A | 11/1997 | Nakajima et al. |
| 5,805,301 A | 9/1998 | Rasanen |

(Continued)

FOREIGN PATENT DOCUMENTS

| AU | 2003201662 | 7/2003 |
| CA | 2472795 | 7/2003 |

(Continued)

OTHER PUBLICATIONS

International Search Report in Application No. PCT/GB2003/000118 dated Apr. 14, 2003, 3 pages.
(Continued)

*Primary Examiner* — Adnan M Mirza
(74) *Attorney, Agent, or Firm* — Panitch Schwarze Belisario & Nadel LLP (57) ABSTRACT

A mobile telephone receives, constructs and displays an image from a server over a mobile telephone network. The server determines the parameters for data transfer from the server to the mobile telephone, the capabilities of the mobile telephone, transfer task requirements, and apportions the processing between the server and the mobile telephone for each of a plurality of elements in each image, thereby to meet the task requirement, which can include being within a predetermined time for task completion, or being the fastest means for task completion. Parameters for data transfer from server to telephone include server transmission bandwidth, phone reception bandwidth, data channel bandwidth, transmission protocol, and channel accessibility. Phone capabilities include the data processing speed, the available memory, display size, and the data processing
(Continued)

software available; Task requirements include the maximum transmission time and the minimum display resolution of the image.

20 Claims, 7 Drawing Sheets

Related U.S. Application Data continuation of application No. 10/501,488, filed as application No. PCT/GB03/00118 on Jan. 14, 2003, now Pat. No. 9,525,785.

(51) Int. Cl.
*H04N 1/00* (2006.01)
*H04N 1/333* (2006.01)
*G06T 15/04* (2011.01)
*G06T 15/80* (2011.01)
*G06T 17/20* (2006.01)

(52) U.S. Cl.
CPC ......... *H04L 67/10* (2013.01); *H04N 1/00106* (2013.01); *H04N 1/33307* (2013.01); *G06T 2200/16* (2013.01)

(58) Field of Classification Search
USPC .................................................. 709/227, 228
See application file for complete search history.

(56) References Cited

U.S. PATENT DOCUMENTS

| 6,400,996 | B1 | 6/2002 | Hoffberg et al. |
|---|---|---|---|
| 6,995,762 | B1 | 2/2006 | Pavlidis et al. |
| 7,050,646 | B2 | 5/2006 | Xu et al. |
| 7,313,386 | B2 | 12/2007 | Kondo et al. |
| 7,363,384 | B2 | 4/2008 | Chatani et al. |
| 2001/0034783 | A1 | 10/2001 | Kitamura |
| 2002/0003535 | A1 | 1/2002 | Cho |
| 2002/0091840 | A1 | 7/2002 | Puller et al. |

FOREIGN PATENT DOCUMENTS

| CN | 1643892 | 7/2005 |
|---|---|---|
| EP | 0652668 | 5/1995 |
| EP | 1058419 | 12/2000 |
| GB | 2401276 | 11/2004 |
| JP | 09-233467 | 9/1997 |
| JP | 11-046361 | 2/1999 |
| JP | 11-112817 | 4/1999 |
| JP | 11-191764 | 7/1999 |
| JP | 11-215481 | 8/1999 |
| JP | 2000-222332 | 8/2000 |
| JP | 2001-177561 | 6/2001 |
| JP | 2001-241965 | 9/2001 |
| JP | 2001-350762 | 12/2001 |
| JP | 2002-009826 | 1/2002 |
| JP | 2005515721 | 5/2005 |
| WO | 0193562 | 12/2001 |
| WO | 03061273 | 7/2003 |

OTHER PUBLICATIONS

Office Action in Japanese Application No. 2009-184904 dated Aug. 4, 2011, 3 pages.
Office Action in U.S. Appl. No. 10/501,488 dated Apr. 28, 2010, 9 pages.
Office Action in U.S. Appl. No. 10/501,488 dated Oct. 18, 2010, 10 pages.
Office Action in U.S. Appl. No. 10/501,488 dated Jun. 8, 2011, 10 pages.
Office Action in U.S. Appl. No. 10/501,488 dated Nov. 16, 2011, 12 pages.
Office Action in U.S. Appl. No. 10/501,488 dated Nov. 16, 2012, 10 pages.
Office Action in U.S. Appl. No. 15/384,008 dated Jul. 13, 2017, 6 pages.

EFFICIENT IMAGE TRANSMISSION

The present application is a continuation of U.S. application Ser. No. 15/384,008, filed Dec. 19, 2016 (now U.S. Pat. No. 9,947,127), which is a continuation of U.S. application Ser. No. 10/501,488, filed Apr. 22, 2005 (now U.S. Pat. No. 9,525,785), which is the National Stage of International Appl. No. PCT/GB03/00118, filed Jan. 14, 2003, which claims the benefit of United Kingdom Appl. No. 0200797.9, filed Jan. 15, 2002; the disclosures of each of the above-referenced applications are incorporated by reference herein in their entireties.

The present invention relates to transmission of displayable images from a source to a receiver. The invention particularly relates to such transmission where resources, such as bandwidth, time or processing power can be limited. The invention, most particularly, relates to the transmission of images which are constructed, or reconstructed, at the receiver.

Increased sophistication of, in particular, mobile telephone systems, has created a demand for ever improved images which tax the ability of the network to carry them and the processing capacity of the receiving device to display them to the required or desired resolution within the available time. The very same problem arises in the field of computer games and in the provision of Internet images. Carriage capacity depends upon instantly available bandwidth, the abilities and processing speed and capacity of the receiver, the desirable maximum tine limit within which the image should be displayed and the desirable minimum resolution in the image.

As demand increases, so the instantly available bandwidth can find itself altered as more subscribers seek access to a limited resource. The present invention seeks to provide an ameliorating solution, capable of coping with such alteration, both in the short term and in the long term.

Different types of receiver have different reception and processing capacities. The present invention seeks to provide a system, method and apparatus capable of accommodating a wide variety of different receivers from a single transmission source.

Many different types of material and images can be provided for transmission. Some material, because of its size or nature, can overwhelm the capacity of the system to provide an adequate transmission service. The present invention seeks to provide a system, method and apparatus capable of adapting to different material to allow its adequate transmission under a wide range of conditions.

The world does not entirely revolve around the act of image transmission and display. The receiving apparatus is required to do other things, such as computation and communication, to name but two. It is very much to the advantage of the system that the act of image transmission and display should not encroach upon the other activities of the receiving device. The present invention seeks to provide a system, method and apparatus capable of minimising the impact of image transmission and display upon the receiving apparatus, thereby freeing the receiving apparatus for other operations.

According to a first aspect, the present invention consists in a method for sending a processed image, comprising one or more elements, from a server to a client for display, said method comprising the steps of: determining the parameters for data transfer from the server to the client; determining the capabilities of the client; determining the task requirements; and apportioning the processing between the server and the client for each element to meet the task requirement.

The invention further provides that the parameters for data transfer from the server to the client can include one, all or some of the server transmission bandwidth, the client reception bandwidth, the data channel bandwidth, the transmission protocol and channel accessibility.

The invention further provides that the capabilities of the client can include one, all or some of the data processing speed of the client, the available memory of the client, the size of display in the client, and the data processing software available within the client.

The invention further provides that the task requirements can comprise one, all or some of the maximum time from transmission to display of the image, and the minimum display resolution of the image.

The invention further provides that each element be constructed for display using a selectable one of a plurality of processing options, and that the method can comprise the step of selecting an option that meets the task requirements.

The invention further provides that selection of the processing option can include measuring or calculating the time to execute of some or all of the plurality of options.

The invention further provides that the construction of an element can comprise one, all or some of: clothing a coarse mesh with a simple texture, clothing a fine mesh with a simple texture, clothing a coarse mesh with a complex texture, clothing a fine mesh with a complex texture, clothing a surface with a complex texture, clothing a surface with a simple texture, and clothing a surface with a three dimensional panel.

The invention further provides that the apportioning of the processing between the server and the client can include allocating the location for each action in the construction of an element.

The invention further provides that the determining of the capabilities of the client can include interrogation of the client by the server.

The invention further provides that interrogation of the client can include the client informing the server of its abilities.

The invention further provides that determining the capabilities of the client can include reference, by the server, to a list of client characteristics for a plurality of different types of client.

The invention further provides that meeting task requirements can include falling within the minimum time to execute, or being the fastest to execute.

The invention further provides that the server can be a server in a mobile telephone system and that the client can be a mobile telephone device.

According to further aspects, the invention includes a system, a server and a client, each adapted to use the above described method.

The invention is further explained, by way of example, by the following description taken in conjunction with the appended drawings in which.

And

Figure 1:
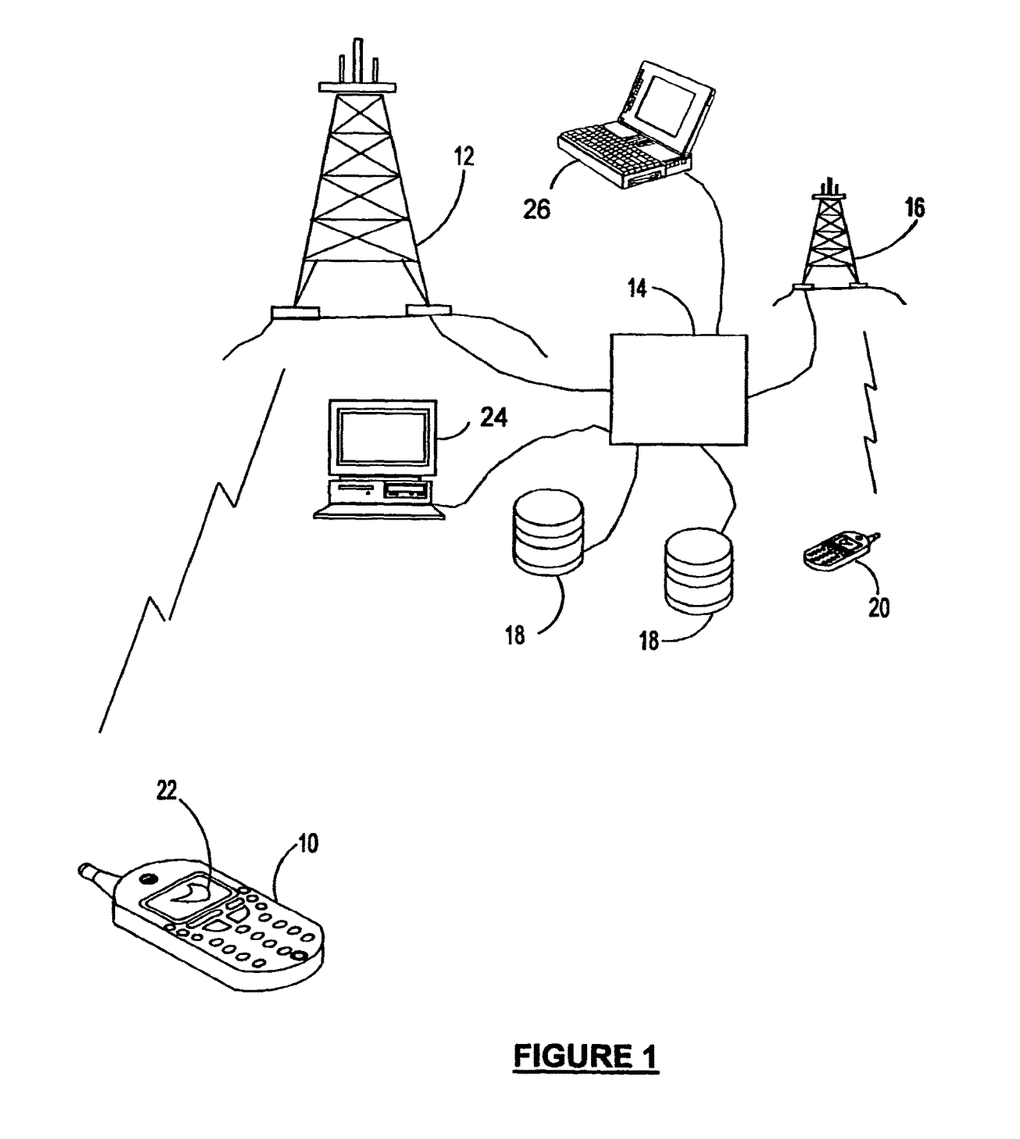
FIG. 1 is a schematic diagram of the environment in which the present invention has its exemplary embodiment.

Attention is drawn to FIG. 1 showing the environment in which the preferred embodiment of the present invention exists.

A mobile telephone 10 is part of a communications system. The mobile telephone 10 communicates with a base station 12 which, in turn, is connected by wires, cables, microwave link or satellite to the terrestrial telephone network 14 which provides communication via further base stations 16 and servers 18. The further base stations 16 permit communication with further mobile telephones 20. The mobile telephone 10 comprises a screen 22 whereon images can be displayed. The terrestrial telephone network 14 can, via the Internet or by direct file transfer, act as the conveyance for images to be displayed on fixed 24 or portable 26 computer equipment and on the screens 22 of mobile telephones 10, 20.

The present invention is concerned with the ability of a fixed resource such as a computer 26, 24 or a server 18 to send an image to the screen 22 of a mobile telephone 10, 20.

Although the invention is hereinafter described with reference to displaying images on the screen 22 of a mobile telephone 10, 20, it is to be understood that the present invention also applies to any environment where an image must be sent to and displayed on a screen 22 or a receiving apparatus where resources may be limited. Such situations include direct file transfer between computers, television, and the Internet. This list is not exclusive.

Figure 2:
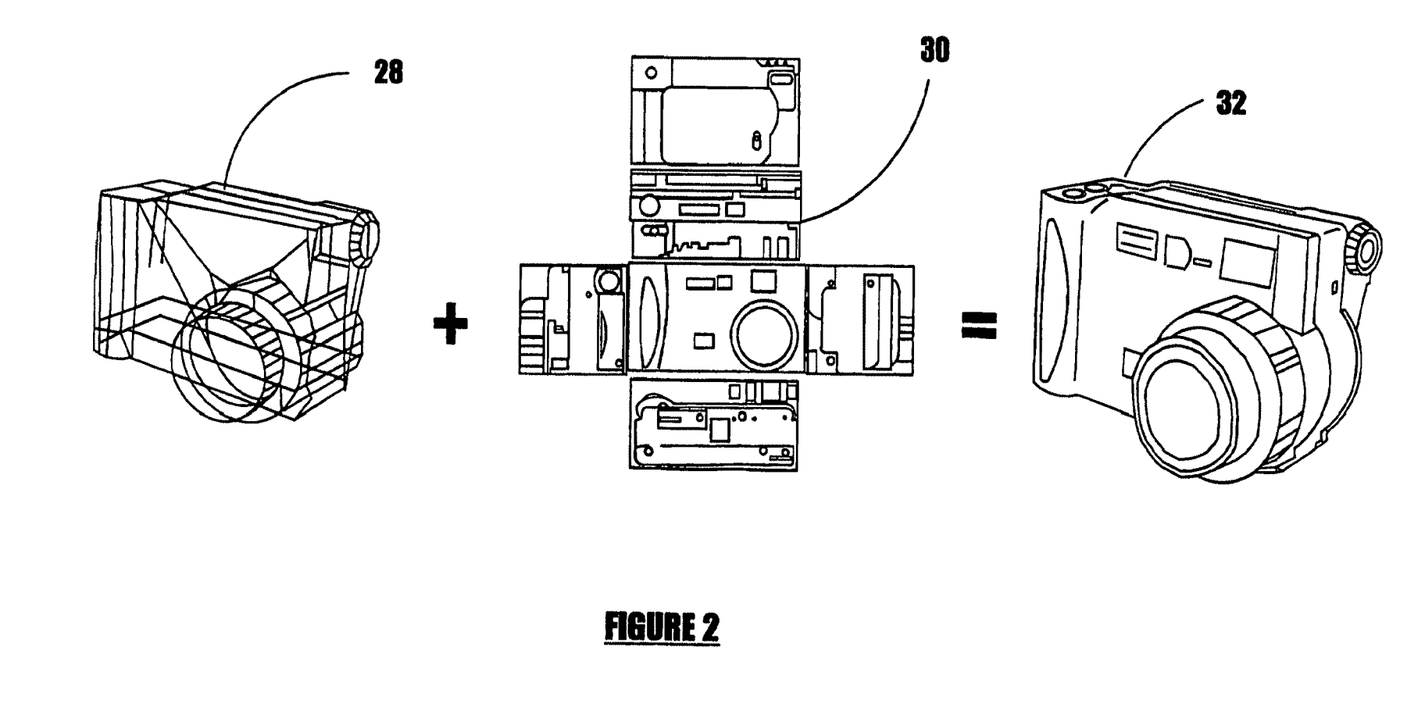
FIG. 2 is an illustrative diagram of a first method, employable within the present invention, of creating a three-dimensional image using a coarse mesh and a detailed skin.

Attention is drawn to FIG. 2, which is a diagram illustrating one method that the present invention can use for transferring an image from a sending device to a receiving device. As will become clear from the description of the present invention, the present invention may use a range of techniques to match the properties of the data transmission channel and the receiver to allow an image to be sent to a receiver at an acceptable quality in an acceptable time, without overwhelming the receiver's processing ability. FIG. 2 illustrates a first technique which can be employed.

A first action is for the transmission device to send a coarse mesh 28 to the receiving device. In the example chosen, a three dimensional image of a camera is to be sent. The coarse mesh 28 comprises a series of straight lines which define the surface of the object. In the simple coarse mesh 28 shown in FIG. 2, the wire frame model can be sent, typically, as a group of data comprising in the region of five kilobytes.

In order to overcome the simplicity of the coarse mesh 28, the next element to be sent is a complex texture 30. A texture is a detailed two-dimensional skin bearing images of the surface of the object. Because the coarse mesh 28 is so simple, in order to make an acceptably detailed-looking end result, a complex texture 30 is necessary. In this example, a typical complex texture 30 can be sent in a data package comprising in the region of five hundred kilobytes.

In order to create the assembled image 32, the complex texture 30 is, in the receiving apparatus, laid or stretched like a skin around the coarse mesh 28. A complete three-dimensional representation 32 of the exemplary camera is thus created and can be viewed from all angles as a complete 3D object. The complex texture 30, in this example, covers the entire surface of the coarse mesh 28.

As will become plain from the following description, a texture can be provided to cover a fractional part of a defining surface.

Depending upon the circumstances, the sending device can adopt different tactics. Unable to be illustrated in this patent application because of the restrictions on the nature of acceptable drawings imposed by the United Kingdom Patent Office, the sending device may use a complex mesh (a wire frame with great detail) in combination with one or more simple textures to achieve a similar acceptable three-dimensional image result. A complex wire frame surface-defining model may, within the present invention, comprise data of around twenty kilobytes. One or more simple textures, in the case of a representation of a radio, defining knobs, stickers, tuning scales etc, can be accommodated within five kilobytes. Within the present invention, therefore, a three-dimensional image of a radio can, if required, be transmitted from a sending apparatus to a receiving apparatus in approximately twenty kilobytes of data.

Another technique which can be used by the present invention, but which, equally, is nearly impossible to illustrate within the drawing restrictions of the United Kingdom Patent Office, uses texturing to overlay extremely complex images onto plain or simply shaped surfaces. Such a technique can be used, for example, when sending three dimensional images of the interior of the Sistine Chapel.

Figure 3:
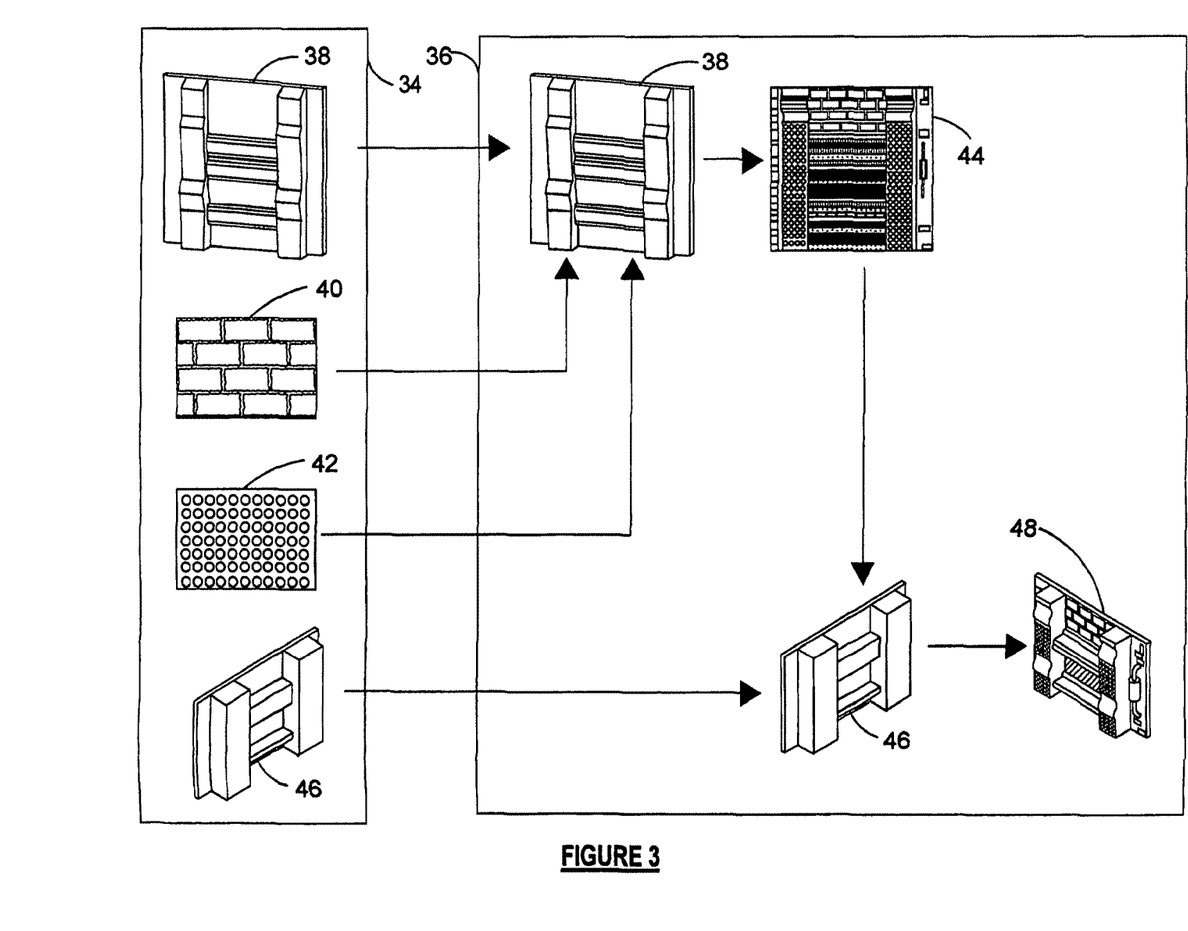
FIG. 3 is a schematic diagram of a method, employable within the present invention, whereby a complex three-dimensional panel can be created using a combination of different wire meshes and textures.

Attention is drawn to FIG. 3, showing another technique available within the present invention.

In FIG. 3 the left hand box 34 represents the activity of the transmitting device, generally known in the art as a server. Again in FIG. 3, the right hand box 36 shows the activity of the receiving device, generally known in the art as a client. FIG. 3 shows one way in which the transmitting device or server can distribute the various activities required in the transmission and the display of an image, to optimal effect, between the server 34 and the client 36 to accommodate the limitations of the channel bandwidth and client processing capabilities.

FIG. 3 shows how secondary modelling can be used to create textures which are then applicable to meshes (wire frame models) to create complex 3D objects or, as will be shown in relation to FIG. 4, panels which can be applied to defining surfaces.

In the example given in FIG. 3, the first action of the server 34 is to create a complex texture, but this time employing the client 36 to do the processing. As a first step, the server 34 sends, to the client 36, a texturing frame 38. This particular texturing frame 38 can, typically, comprise no more than ten kilobytes of data, despite its fairly complex detail. The purpose of the texturing frame 38 is to provide sufficient surfaces and surface detail to create a texture, as was previously shown as item 30 in FIG. 2. Along with the texturing frame 38 the server 34 also sends one or more simple textures 40, 42. The textures 40, 42 are then applied, by the client 36 to the texturing frame 38. The textures 40, 42 can, typically, in an example such as this, comprise no more than around five kilobytes of data. The simple textures 40, 42 are applied, by the client 36, to the texturing frame 38, to create a complex texture 44. As well as simply applying the simple textures 40, 42 to the texturing frame 38, the client 36 can also be instructed to apply lighting and shading operations to cause the complex texture 44 to have an immense richness of detail. Thus, by a few simple instructions, wire frames and textures, a richly endowed complex texture 44 can be created. The complex texture 44 does, of course, reduce to an effective flat surface. That is to say that the three-dimensional detail of the texturing frame 38 is reduced to the two-dimensional surface of the complex texture 44. As will be seen, three-dimensional detail is restored.

As a second activity, the server 34 transmits, to the client 36, a simple frame outline 46. In the example given, the simple frame outline 46 can comprise as little as two kilobytes of data. The client 36 wraps the complex texture 44 onto the wire frame outline 46 to create a complex panel 48. The frame outline 46 restores the three-dimensional quality of the complex texture 44. Equally, if so desired, although requiring more complex processing on the part of the client 36, some or all of the three-dimensional detailing of the texturing frame 38 can be retained so that the complex texture 44 has at least a partial three-dimensional quality which can be added to the frame outline 46 to create yet extra three-dimensional detail. Although the end result, in this example, is a complex panel 48, where only one side needs to be visible, there is nothing, within the present invention, to stop the server 34 and the client 36 co-operating to create images such as the camera of FIG. 2. The server 34 would choose a technique, such as that shown in FIG. 3, where the client 36 has sufficient processing capacity of sufficient speed to create the complex panel 48 picture element within an acceptable time. In other circumstances the server 34, if the band width of the communications channel were sufficiently large, and the processing capacity of the client 36 sufficiently minuscule, might send a complete photographic image of the complex panel 48 if that is all that it could do within the allotted time. As will become plain, the essence of the present invention is flexibility and adaptability to permit image transmission, in acceptable time, over all sorts of data channels and using all manner of equipment.

Figure 4A:
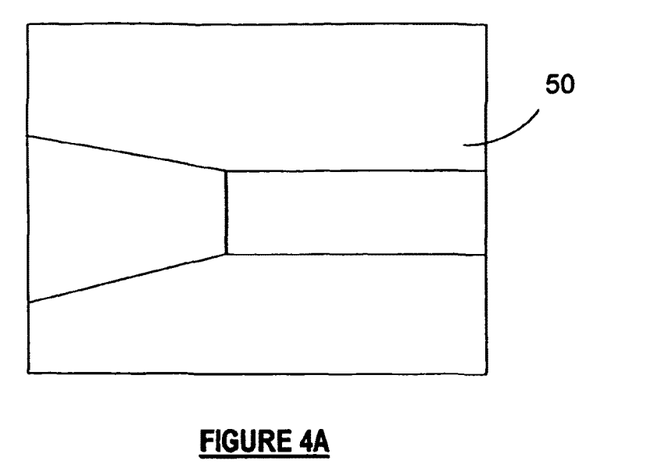
FIGS. 4a and 4b illustrate how, within the invention, a scene, in this example the interior of a room, can be created using different panels and textures.
Figure 4B:
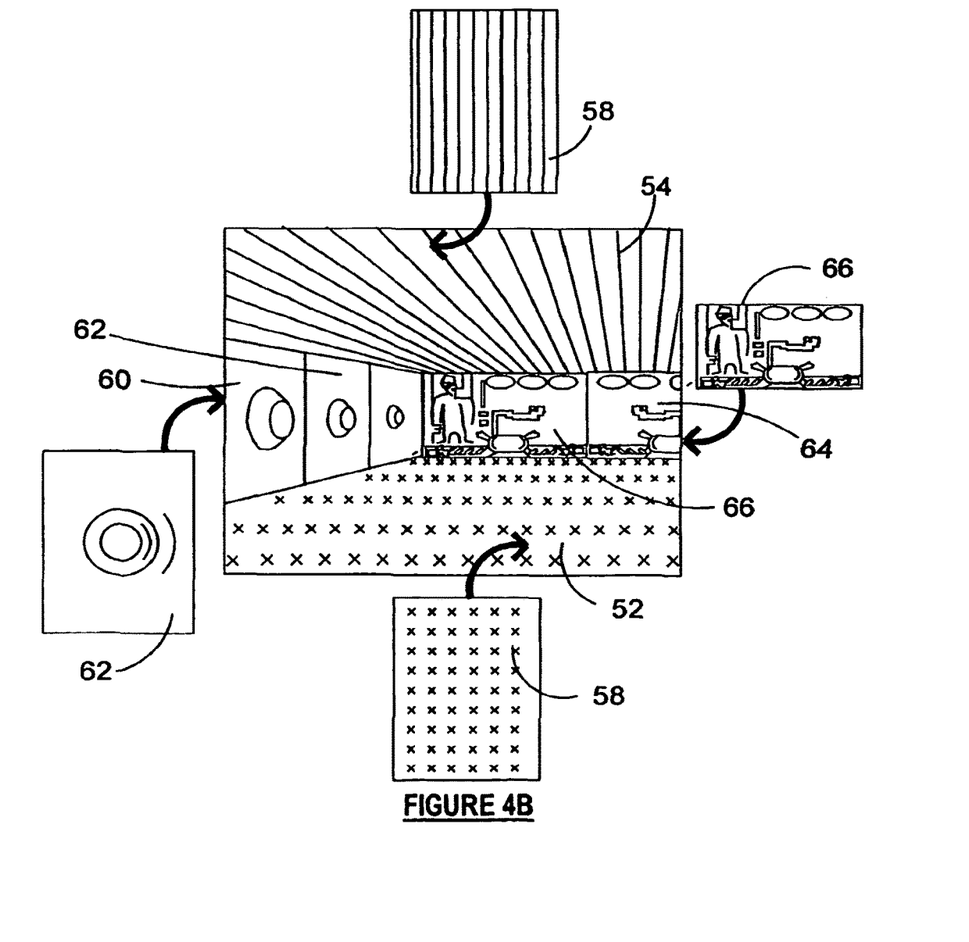

Attention is drawn to FIG. 4A and to FIG. 4B showing another example of the present invention causing a server 34 to co-operate with a client 36 to create a final image. FIG. 4A shows a room 50 as defined by a simple cuboid surface, one corner of which is visible in this view.

FIG. 4B shows how the present invention can be used to create an image of the room 50, in this example a fanciful interior of a tomb or temple from an unspecified ancient civilisation.

The floor 52 and ceiling 54 of the room 50, in this example, are covered by respective first 56 and second 58 textures with a substantially flat surface. The side walls 60, in this example, are covered by complex three-dimensional panels 62, which could be created by similar techniques to those shown in FIG. 3. Just by way of contrast, the end walls 64 are covered in complex texture panels 66 which can be created in a manner similar to the complex texture 44 of FIG. 3 or may be simply transmitted as the complex texture 30 of FIG. 2, dependent upon the capacity of the data channel and the processing capacity of the client 36.

So far, the present invention has been described with reference to techniques which can be elected for the transmission and display of an image. The description now passes to explanation of the manner in which the present invention can elect which methods to employ from among those already described.

Figure 5:
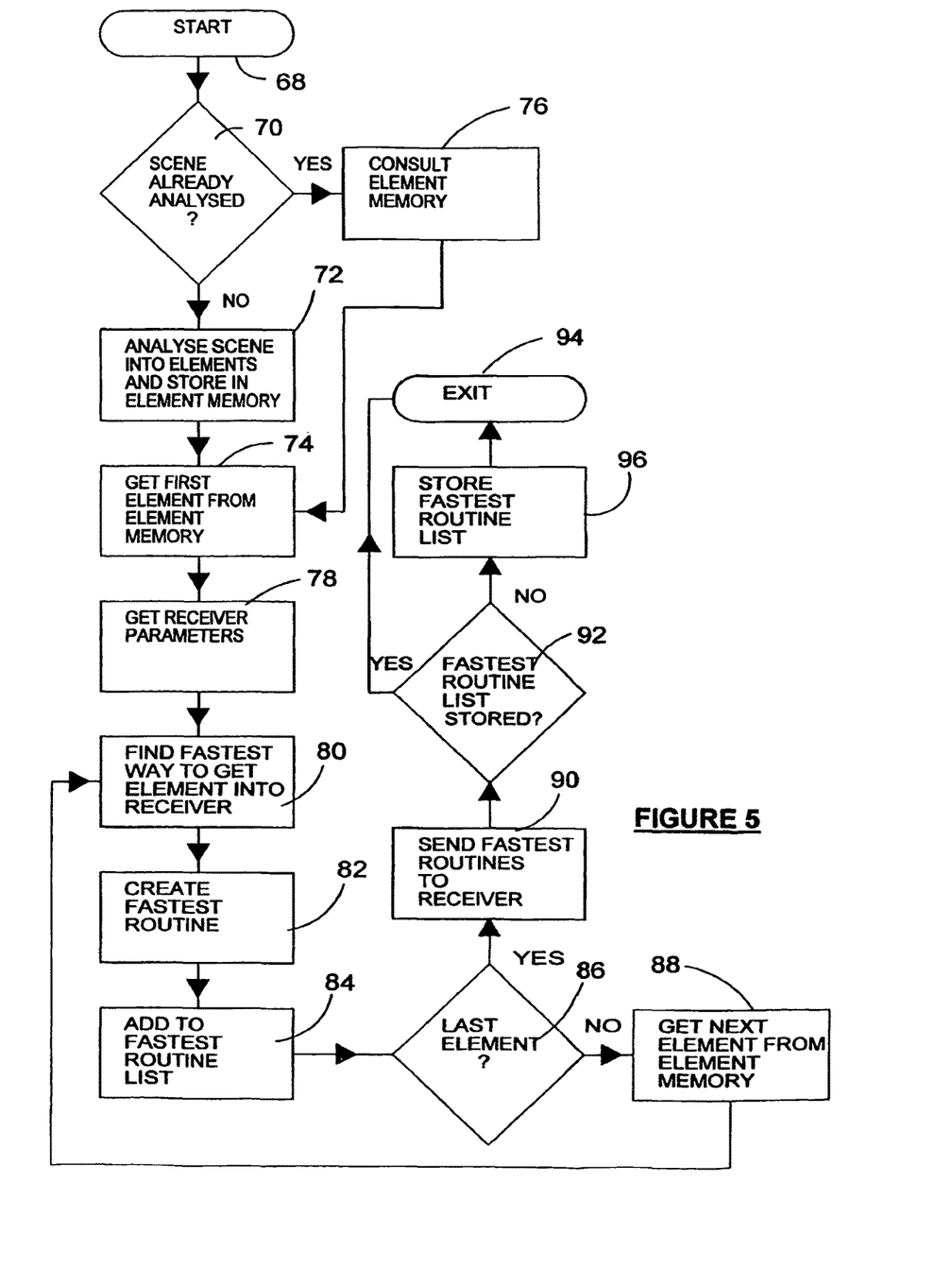
FIG. 5 is a flow chart illustrating a manner in which a transmitting apparatus can send an image to a receiving apparatus.

Attention is drawn to FIG. 5 showing a flow chart of the manner in which the server 34 can prepare and send an image or scene to a client 36.

From start 68 a first test 70 checks to see if the server 34 already has the scene analysed. This is the probable condition since the server 34 will, most probably, be providing the client 36 with stock material such as a movie, cartoon, advert or other screen also provided to many other clients 36 on demand, and provided to the server, from an outside supplier, in a (hopefully) pre-analysed form. If, however, the scene has not already been analysed into elements, each suitable for separate transmission, a first operation 72 analyses the scene into such items as may be sent. These items or elements are stored. Control then passes to a second operation 74. If the first test 70 detected that the scene was already analysed, a third operation 76 consults the element memory and also passes control to the second operation 74.

The stored analysed scene can be stored in many ways. Each element, such as the complex panel 48 of FIG. 3, can be derived using different recipes. At one extreme, a complete three-dimensional bit map can be provided. Other techniques include those shown in FIG. 2 and in FIG. 3, as well as those others alluded to but incapable of being illustrated under the present regime. So, when reference is made to an element, that element includes a plurality of possible recipes for its creation and display.

Returning to FIG. 5, the fourth operation 74 gets the first element of the scene from the element memory. A fourth operation 78 then gets the parameters, from the client 36, of the receiver (client). The parameters include such items as the bandwidth of the connecting data channel, the memory capacity of the receiver, the processing clock speed of the receiver, the processing type or style of the receiver, the display type, and any other factors which will affect the manner in which an image of a scene can be sent to the client 36. In general terms, all that is necessary is for the receiver type to be indicated by an identifier so that the server 34 can recover the receiver parameters from a memory. If this is not the case, the receiver must be interrogated to discover the necessary data.

Having discovered the potentials and limitations of the communications system and the client 36, a fifth operation 80 has the server 34 seeking the fastest way to get the picture element into the receiver (client 36). If the client 36 is of a type already known, the server 34 need only look up pre-stored values to know what to do. If any feature of the client system 36 is unknown, the server 34 either calculates, or tests by doing, the amount of time required to transfer an element or group of elements to the client 36. Where a number of elements are concerned, every possible combination will be considered in case there is a solution which turns out to be faster than the others. Once a viable solution has been found, it is stored to be retrieved when required in the future.

Having found the fastest or an acceptably fast way to get an element into the client 36, a sixth operation 82 creates the fastest routine in the form of data and instructions to be sent to the client 36. A seventh operation 84 then adds the fastest routine to a fastest routine list which collects together the various versions of the elements to be transmitted to create the final entire scene. A second test 86 checks to see if the last element of the scene has been added to the fastest routine list. If not, an eighth operation 88 retrieves the next elements from the element memory and passes control back to the fifth operation 80 for further elements to be prepared for transmission.

If the second test 86 detects that the last element of the scene has been prepared for transmission, a ninth operation 90 sends the prepared group of fastest routines to the receiver (client 36) via the data channel, together with any instructions. A third test 92 then checks to see if the group of fastest routines for that particular scene has already been stored. If it has, control passes to exit 94. If not, a tenth operation 96 stores the group of fastest routines for that particular client 36 or style of client so that they may be retrieved for instant use on any future occasion.

Figures 6, 7:
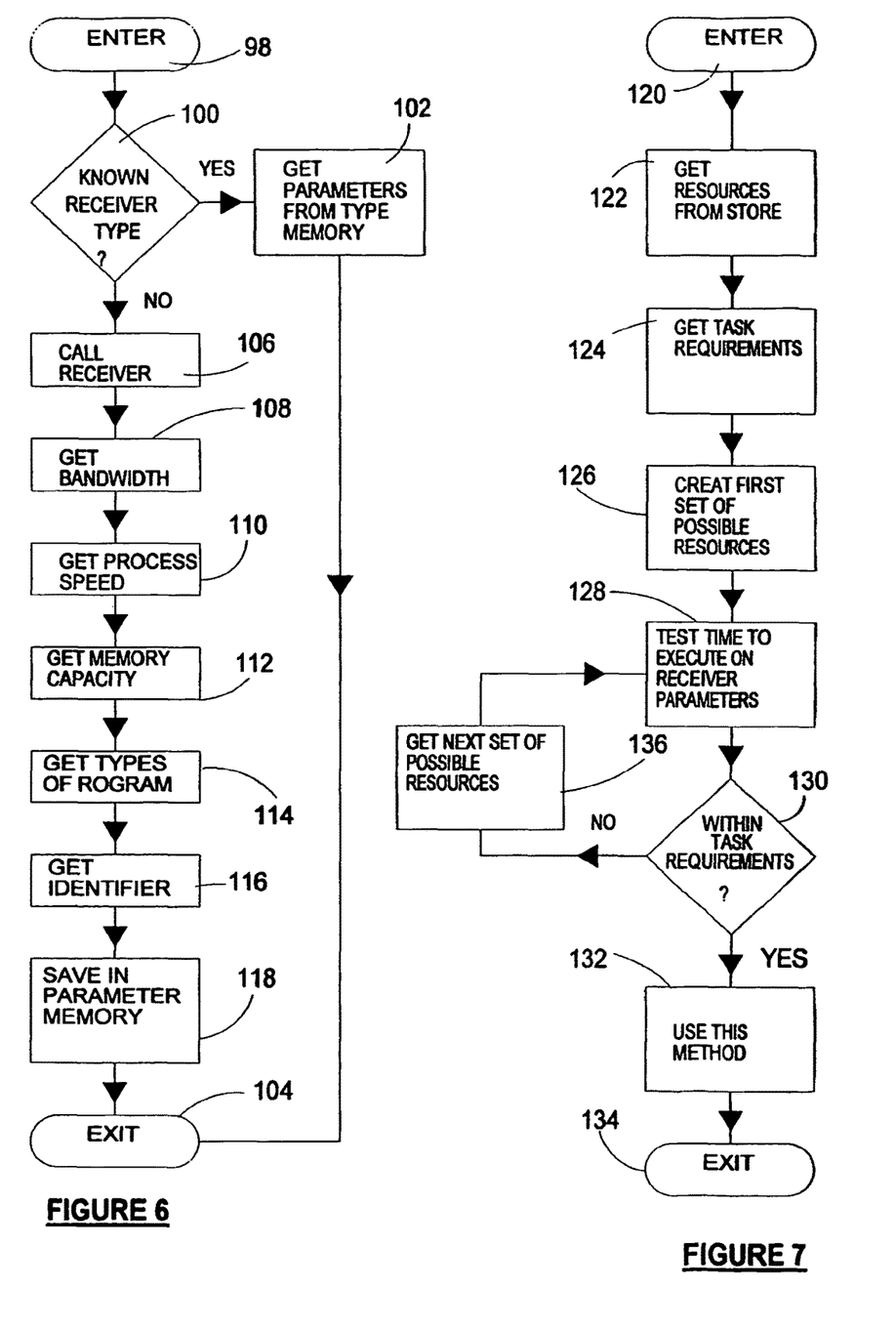
FIG. 6 is a flow chart illustrating how a transmitting apparatus can identify the nature of a receiving apparatus.
FIG. 7 is a flow chart illustrating how a transmitting apparatus can arrive at an acceptably adequate solution for transmitting an image to a receiving apparatus.

Attention is drawn to FIG. 6, a flow chart showing how the server 34 interacts with the client 36 (receiver) to determine the manner in which to send an image of a scene to the client 36. FIG. 6 corresponds to the fourth operation 78 of FIG. 5.

From entry 98 a fourth test 100 checks to see if the receiver and its associated data channel is of a known type. If it is, an eleventh operation 102 recalls the known parameters from a type memory and exits the routine at exit 104. If the fourth test 100 detects that the receiver and its data channel is of an unknown type, a twelfth operation 106 has the server 34 call the client 36 (receiver) and interrogate it to get the necessary details. A thirteenth operation 108 determines the limiting bandwidth of the data channel and/or of the receiver. A fourteenth operation 110 has the server 34 being informed of the processing type and speed of the receiver. A fifteenth operation 112 has the server 34 informed of the memory capacity of the client 36. A sixteenth operation 114 has the server 34 informed of the types of program or image display/processing/reconstruction programs or software contained within the client 36. A seventeenth operation 116 has the server 34 informed of the type identifier of the receiver (client 36). An eighteenth operation 118 then has the server 34 store the client 36 (receiver) parameters so that they can be instantly retrieved when next that or a similar receiver is encountered.

Attention is drawn to FIG. 7, a flow chart illustrating one way in which the server 34 can execute the fifth operation 80 of FIG. 5 where the fastest way to get an element of the scene into the receiver or server 36 is found.

From entry 120 a nineteenth operation 122 retrieves the available resources from the element memories that are associated with the particular selected element. These can include such items as complete three-dimensional bitmaps, wire frames, textures, texture frames and any other part which can be used, and happens to be available, for creating the selected element of the image. Thus, the server 34 has awareness of the parts which it has to hand to create the selected element of the scene.

A twentieth operation 124 then either receives, or retrieves from store, the task requirements. Task requirements can include, but are not limited to, maximum time for execution, minimum resolution on the image on the screen 22, and so on.

Having determined what resources and minimum requirements exist, a twenty-first operation 126 puts together the first possible group of resources capable of sending the selected picture element to and displaying the selected picture element at the client 36. A twenty-second operation 128 then tests the time to execute the transmission and display of the selected picture element. As earlier described, this can be done by numerical calculation, by adopting the same memory capacity, processing software and processing style as the client 36 and actually measuring how long was taken to execute, or by a combination of the two methods.

Having tested the time of execution in the twenty-second operation 128, a fifth test 130 checks to see if the execution time falls within the task requirements set out in the twentieth operation 124. If that method falls within the task requirements, a twenty-third operation 132 elects that method to be used and the routine proceeds to exit 134.

If the fifth test 130 determines that the particular set of possible resources has not fallen within the task requirements as defined by the twentieth operation 124, a twenty-fourth operation 136 gets the next set of possible resources capable of transmitting and displaying the selected element of the image, and returns control to the twenty-second operation 128 where the time to execute is measured.

If, after testing the time to execute of all possible sets of resources, no set has been found which falls within the task requirements, the server 34 can select the set of resources which takes the least time, or alternatively, can signal to the client 36 (receiver) that task requirements cannot be met.

Figure 8:
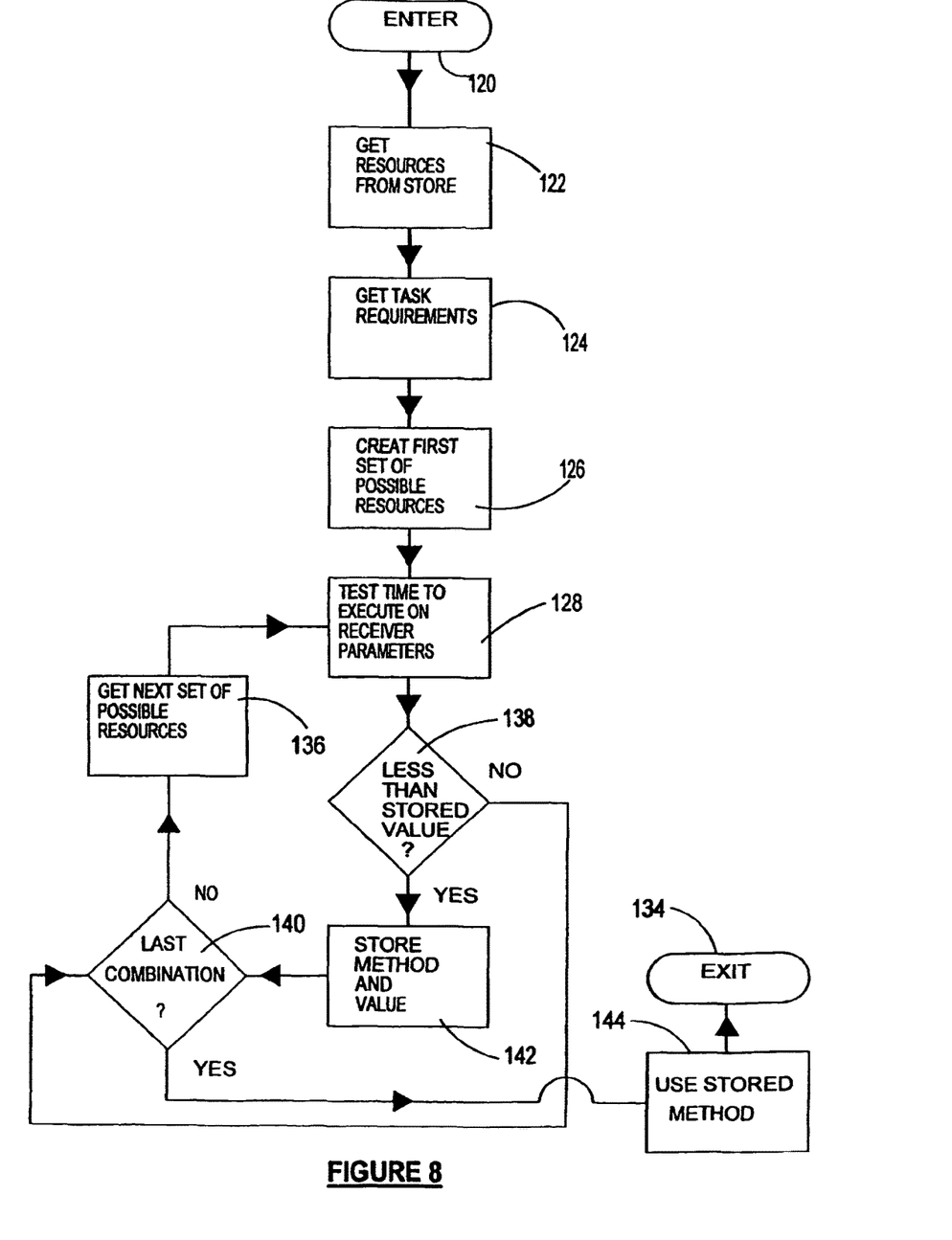
FIG. 8 is a flow chart illustrating how a sending apparatus can optimise the transmission of an image to a receiving apparatus.

Finally, attention is drawn to FIG. 8, a flow chart showing essentially the same function as FIG. 7, but where the fastest rather than the first acceptable routine within the task requirements is selected. FIG. 7 can be used where there is a pressing urgency to provide an image to a client 36 of unknown type. FIG. 8 can be used, at leisure, where the server 34 can find the fastest way to provide an image of a scene to a client 36. Like numbers denote like elements. All elements are the same, as in FIG. 7, until what would have been the fifth test 130 which is replaced by a sixth test 138 which looks to see if the execution time discovered on the twenty-second operation 128 is less than a stored value. If it is not, that particular set of possible resources is simply discarded, a seventh test 140 checks to see if it is the last possible combination, and the twenty-fourth operation 136 gets the next set of possible resources for the twenty-second operation 128 if it is not.

If the sixth test detects that the execution time is less than the stored value, a twenty-fifth operation 142 discards the old stored value and method and, in its place, stores the currently tested set of possible resources and the execution time. The twenty-fifth operation 142 therefore keeps a running records of what has, so far, been found to be the fastest method. When the seventh test 140 detects that the last combination has been detected, a twenty-sixth operation 144 selects the stored method as the one to use.

The present invention has been described with reference to a limited number of exemplary image transmission, reconstruction and display methods. It is to be appreciated that the present invention applies to any situation where image material can be sent from a source to a receiver via a data transmission resource and can be reconstructed for display.

The invention claimed is:

1. A method, comprising:
    a first computer system performing a first portion of an image rendering process to render an image to be displayed; and
    the first computer system sending, to a second computer system, a result from performance of the first portion of the image rendering process, wherein the result from performance of the first portion of the image rendering process indicates, to the second computer system, a second portion of the image rendering process to be performed on the result.

2. The method of claim 1, wherein performing the first portion includes the first computer system generating a mesh defining a shape of an object that is to be included in the image, and wherein the sent result includes the generated mesh.

3. The method of claim 2, wherein performing the first portion includes the first computer system generating a texture for a surface of the object, and wherein the sent result includes the generated texture.

4. The method of claim 3, wherein the second portion includes applying the generated texture to the generated mesh in performance of the second portion of the image rendering process.

5. The method of claim 1, further comprising:
the first computer system instructing the second computer system to perform lighting and shading operations on the result, wherein the lighting and shading operations are included in the performance of the second portion of the image rendering process.

6. The method of claim 1, further comprising:
prior to performing the first portion of the image rendering process, the first computer system determining a processing capacity of the second computer system; and
the first computer system selecting which portions of the image rendering process are to be performed by the second computer system based on the processing capacity of the second computer system.

7. The method of claim 1, wherein the second portion includes displaying the rendered image.

8. A mobile device, comprising:
a processor; and
a memory coupled to the processor, wherein the memory stores instructions, that when executed by the processor, cause the processor to perform operations comprising:
receiving, from a server computer system, a result from a performance of a first portion of an image rendering process to render an image to be displayed; and
performing a second portion of the image rendering process by operating on the result from the performance of the first portion of the image rendering process.

9. The mobile device of claim 8, wherein the operations further comprise:
in response to a request for attributes associated with the mobile device, sending, to the server computer system, information indicating a processing speed of the processor and a bandwidth of a data channel between the mobile device and the server computer system, wherein the second portion is selected based on the information.

10. The mobile device of claim 8, wherein the operations further comprise:
receiving, from the server computer system, information indicating operations to be performed by the processor for the second portion of the image rendering process.

11. The mobile device of claim 8, wherein performing the second portion includes:
applying a texture to a mesh to create a three-dimensional representation of an object defined by the mesh, wherein the texture and the mesh are included in the result received from the server computer system.

12. The mobile device of claim 8, wherein performing the second portion includes:
performing lighting and shading operations on a texture included in the result received from the server computer system.

13. The mobile device of claim 8, wherein the operations further comprise:
after performing the second portion of the image rendering process to render the image, displaying the image.

14. A server system, comprising:
a processor; and
a memory coupled to the processor, wherein the memory stores instructions, that when executed by the processor, cause the processor to perform operations comprising:
generating a result by performing of a first set of operations associated with an image rendering process to render an image to be displayed; and
sending the result to a client device configured to operate on the result in performance of a second set of operations associated with the image rendering process.

15. The server system of claim 14, wherein the first set of operations includes:
generating a texture frame that provides surfaces to which textures may be applied; and
generating one or more textures specifying visual appearances for the surfaces of the texture frame, wherein the result includes the texture frame and the one or more textures.

16. The server system of claim 14, wherein the operations further comprise:
requesting, from the client device, parameters specifying attributes associate with the client device that affect a manner in which the image is to be rendered, wherein the parameters include at least one of a bandwidth associated with a communication channel between the server system and the client device, a processing speed of the client device, or a memory capacity of the client device.

17. The server system of claim 16, wherein the operations further comprise:
based on a size of the bandwidth, allocating, to the client device, the second set of operations associated with the image rendering process.

18. The server system of claim 17, wherein the operations further comprise:
retrieving a set of task requirements specifying a maximum time for execution of the image rendering process; and
based on the processing speed of the client device, determining whether the second set of operations allocated to the client device are executable by the client device within the maximum time.

19. The server system of claim 18, wherein the operations further comprise:
based on the determining, adjusting the second set of operations allocated to the client device such that the second set of operations are executable by the client device within the maximum time.

20. The server system of claim 16, wherein the operations further comprise:
storing the parameters for subsequent interactions with the client device, wherein the parameters are usable in emulating the processing speed and the memory capacity of the client device.

* * * * *